United States Patent [19]

Dauber

[11] 4,310,485

[45] Jan. 12, 1982

[54] METHOD OF IMPROVING THE FLATNESS OF COMPRESSION-ROLLED PLASTIC FILM

[75] Inventor: Rikhard C. Dauber, Danville, Calif.

[73] Assignee: Crown Zellerbach Corporation, San Francisco, Calif.

[21] Appl. No.: 191,472

[22] Filed: Sep. 26, 1980

[51] Int. Cl.³ ................... B29C 17/02; B29C 25/00
[52] U.S. Cl. ............................ 264/288.4; 264/280; 264/346
[58] Field of Search ............ 264/175, 235, 235.6, 264/280, 288.4, 288.8, 289.3, 346

[56] References Cited

U.S. PATENT DOCUMENTS

| | | | |
|---|---|---|---|
| 2,177,659 | 10/1939 | Kimble et al. | 264/280 |
| 2,812,550 | 11/1957 | Chavannes | 264/288.4 |
| 3,257,490 | 6/1966 | Hovermale et al. | 264/289.3 |
| 3,345,447 | 10/1967 | Grant | 264/235 |
| 3,504,075 | 3/1970 | Williams, Jr. et al. | 264/175 |
| 3,632,726 | 1/1972 | Knox et al. | 264/235 |
| 3,891,737 | 6/1975 | Marsh et al. | 264/235.6 |
| 4,003,973 | 1/1977 | Kurokawa | 264/235 |
| 4,085,187 | 4/1978 | Jenks et al. | 264/280 |
| 4,120,931 | 10/1978 | Fukushima et al. | 264/289.3 |
| 4,134,957 | 1/1979 | Yoshimura | 264/288.4 |

*Primary Examiner*—James B. Lowe
*Attorney, Agent, or Firm*—S. M. Teigland

[57] ABSTRACT

The flatness of compression-rolled plastic film is improved by passing the film under tension over heated rolls, stretching the heated film, setting the stretched film by passing it over a tempering roll, and then cooling the set film by passing it over a cooling roll.

10 Claims, 1 Drawing Figure

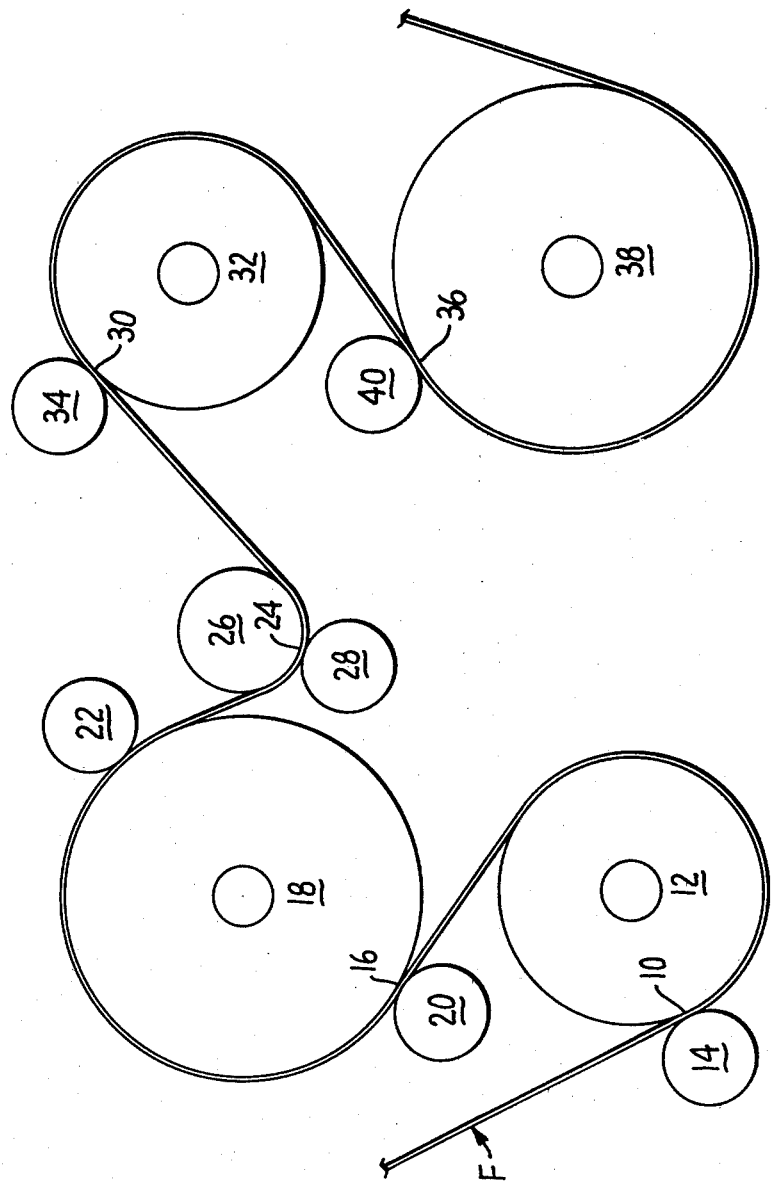

METHOD OF IMPROVING THE FLATNESS OF COMPRESSION-ROLLED PLASTIC FILM

This invention is a process for improving the flatness of plastic film that has been subjected to compression rolling. The term "compression rolling", as used herein and as understood in the art, refers to the process of passing a plastic film through the nip of a pair of rolls at a temperature below the softening point of the film to effect a single pass reduction in the thickness of the film of at least five percent. In preferred embodiments, the thickness of the film is reduced at least fifty percent. Compression rolling is described in U.S. Pat. Nos. 3,504,075 and 4,085,187, which are incorporated herein by reference.

Compression rolling improves the stiffness (modulus), tensile strength and clarity of plastic film. In addition, the length of the film is increased by an amount corresponding to the reduction in thickness. For example, a film whose thickness has been reduced 75% has a length which is about four times greater than the original length. However, one drawback of compression rolling is that the rolled film tends to be "baggy", i.e., it is not flat. As a result, the film is difficult to process on machines, such as packaging machines and printing presses.

In accordance with this invention, the flatness of compression-rolled plastic film is improved by:

(a) passing the compression-rolled film under tension over the surface of at least one roll while heating the film on the roll or rolls to an elevated temperature below the melting point of the plastic film, (b) passing the heated film through the nip between a driven roll and a nip roll such that the film is stretched at least three percent in the machine direction, (c) while maintaining the film under tension, setting the stretched film by passing it over a tempering roll, and (d) while still maintaining the film under tension, cooling the tempered film by passing it over a cooling roll.

FIG. 1 is a diagram of apparatus suitable for carrying out the process of this invention.

Referring to the drawing, compression-rolled film F is fed continuously to the apparatus from a suitable source (not shown). The film is preferably fed directly from the compression rolling operation, but may be fed from a supply roll if desired. The film is fed to the nip 10 between a first heated roll 12 and nip roll 14. It is essential in the practice of this invention that the film be fed to the nip 10 under tension.

After passing over the first heated roll 12, the film is fed while still under tension to the nip 16 between a second heated roll 18 and nip roll 20. If desired, another nip roll 22 can be used to help maintain the film on the second heated roll 18.

The temperature of heated rolls 12 and 18, and the dwell time of the film on the rolls, is such that the film is heated to a temperature which approaches, but which is less than, the melting point of the film material. The temperature of the film is preferably between about 5° and 40° C. below the melting point of the film material.

As illustrated in the drawing, which represents the best mode contemplated for practicing the invention, two heated rolls 12, 18 are preferably employed to heat the film to the desired temperature. However, it is possible to practice the invention using only one, or more than two, rolls to heat the film. It is also possible to use another source of heat, such as infrared radiation or a hot gas, to heat the film while it is on the roll or rolls. In any event, it is essential that the film be heated while it is in contact with the surface of one or more rolls. The reason for this is that if the film is heated without being supported under tension on a roll surface, the film will tend to contract in both the machine and transverse directions, which is undesirable. For this reason, the gap between heated rolls 12, 18 (as well as between other rolls over which the film passes) should be as short as possible to minimize contraction of the film.

After passing over the second heated roll 18, the film is fed to the nip 24 between driven roll 26 and nip roll 28. The driven roll 26 is run at a speed which stretches the film in the machine direction. The amount of stretch for the purpose of improving the flatness of the film is preferably from about 3 to 20%, more preferably from about 5 to 10 percent. However, the film can be stretched more than that which is necessary to improve the flatness of the film. For example, the film can be stretched as much as 300 percent or more if desired.

After passing through the nip 24, the stretched film is fed to the nip 30 between tempering roll 32 and nip roll 34. The film is set as it passes over the tempering roll 32; that is, the improvement in flatness effected by stretching the film is fixed as a property of the film. The time required to set the film is at least about 0.05 second, and depends on the composition and thickness of the film. For example, a polyolefin film having a thickness of about one mil requires about 0.1 to 0.2 second. Thicker films would require longer times, up to one or two seconds. However, there is no upper time limit because the longer the time the better the fixation of improved properties. The temperature of the film should preferably not be allowed to drop more than about 40° C. as it is being set. The tempering roll 32 must be heated to prevent the temperature of the film from dropping more than about 40° C., and may be heated to a temperature as high as the temperature of the film at the time it was stretched. In preferred embodiments, however, the temperature of the film is allowed to drop between about 10° and 20° C. from the temperature at which the film was stretched.

After passing over tempering roll 32, the film is fed to the nip 36 between cooling roll 38 and nip roll 40. The temperature of cooling roll 38 and the dwell time of the film on the roll is such that the film is cooled to a temperature which approaches ambient temperature. The film is preferably cooled to a temperature below about 70° C., more preferably below about 50° C. It is not necessary to cool the film below ambient temperature, of course. Only one cooling roll is necessary to cool the film, but two or more cooling rolls may be used if desired. In any event, the film is cooled by being passed over the surface of one or more cooling rolls while it is still in a state of tension after being set.

The tension employed in passing the film over the rolls in the process of this invention is that which is sufficient to prevent the film from contracting in the machine film direction but which does not substantially stretch the film. As a result of being held under tension while being passed over the rolls, the film does not contract more than about four percent in the transverse direction.

The pressure of the nip rolls 14, 20, 34, 40 against the heating, tempering and cooling rolls 12, 18, 32, 38, respectively, is sufficient to maintain the film against the rolls in a state of tension throughout the process, but not great enough to deform the film. The surfaces of the heating tempering and cooling rolls 12, 18, 32, 38 are preferably bare metal, such as chrome. The nip rolls are preferably covered with an elastomeric material.

This invention is applicable to any film material which can be comression-rolled, such as polyolefins, polyesters, and polyamides, but is especially applicable to polyethylene and polypropylene and copolymers of ethylene and propylene with other ethylenically unsaturated monomers wherein the ethylene or propylene content is at least fifty mole percent. When the film material is polyethylene, the film is preferably heated to a temperature between about 80° and 110° C. When the film is polypropylene, the film is preferably heated to a temperature between about 120° and 140° C. Multilaminate as well as single layer films can be compression rolled and improved by the process of this invention.

In addition to improving flatness, the process of this invention also improves other properties of the film, including stiffness, shrinkage and water vapor transmission rate. Generally speaking, compression rolling effects essentially the same changes in a plastic film as stretching. For example, a film is stretched (i.e., monoaxially oriented) in order to extend it and to improve its strength and stiffness, and a film is compression rolled for the same reasons. Hence, stretching a compression-rolled film would appear to be redundant and would not be expected to improve any properties of the film.

It has previously been proposed, as in U.S. Pat. No. 3,257,490, to improve the flatness of biaxially oriented polypropylene film by heat treating the film while permitting it to retract in both the machine and transverse directions, and then stretching the film in the machine direction at an elevated temperature. In contrast, in the process of this invention, the compression-rolled film is not permitted to retract. In order to avoid retraction, the film is held under tension as it is heated after being compression-rolled, and as it is set and then cooled after being stretched. If compression-rolled film were subjected to the process disclosed in U.S. Pat. No. 3,257,490, the film would become baggier rather than flatter.

EXAMPLE

A film of polypropylene having an initial thickness of 2 mils was compression rolled to a thickness of 0.74 mil. The compression-rolled film was passed, under a tension of 0.6 kilogram per cm of film which, over the surface of a first heated roll and then over the surface of a second heated roll, as shown in the drawing. The temperature of the heated rolls was 130° C. Each roll had a circumference of one meter, and the speed of the film was 30 meters per minute. The dwell time of the film on each roll was about 2 seconds, which was sufficient to the heat the film to about 120° C. The melting point of the film was about 160° C. The heated film was then passed through the nip between a driven roll and a nip roll such that the film was stretched 11 percent in the machine direction. The stretched film was then passed over a tempering roll and a cooling roll, as shown in the drawing. The temperature of the tempering roll was 110° C. and the temperature of the cooling roll was 15° C. Each roll had a circumference of one meter. The dwell time of the film on each roll was about one second, which was sufficient to cool the film to about 40° C.

Before being subjected to the process of this invention, the compression-rolled film was baggy and not suitable for use on automatic machines. The film had a deviation from flatness of 0.5%. After being subjected to the process of this invention, the film was essentially flat and suitable for use on automatic machines. The film had a deviation from flatness of 0%. The deviation from flatness was determined by ANSI/ASTM D1604. The effect of the process of this invention on other properties of the film is shown in the following table.

|  |  | Before | After |
|---|---|---|---|
| CALIPER, MILS |  | .74 | .66 |
| WIDTH, CM |  | 31.75 | 30.8 |
| MODULUS, PSI × $10^3$ (MD/TD) |  | 11.6/4.3 | 26.4/4.7 |
| TENSILE STRENGTH, PSI × $10^3$ (MD/TD) |  | 21.5/3.2 | 27.4/4.7 |
| HAZE % |  | 3.5 | 3.9 |
| GLOSS % |  | 78 | 88 |
| WVTR, gm/100 sq. in/hour |  | .69 | .59 |
| SHRINKAGE, % (MD/TD) | 66° C. | 0/1 | 0/0 |
|  | 93° C. | 2/6 | 1/0 |
|  | 115° C. | 15/3 | 2/0 |

I claim:

1. A method of improving the flatness of compression-rolled plastic film comprising
   (a) passing the compression-rolled film under tension over the surface of a roll while heating the film on the roll to an elevated temperature below the melting point of the plastic film,
   (b) passing the heated film through the nip between a driven roll and a nip roll such that the film is stretched at least three percent in the machine direction,
   (c) while maintaining the film under tension, passing the stretched film over a tempering roll to set the film on the roll, and
   (d) while still maintaining the film under tension, passing the set film over a cooling roll to cool the film to a temperature which approaches ambient temperature.

2. The method of claim 1 wherein the tension exerted on the film is sufficient to prevent the film from contracting in the machine direction.

3. The method of claim 2 wherein the film is heated by means of the roll over which the film is passed while it is heated.

4. The method of claim 3 wherein the film is heated to a temperature between about 5° and 40° C. less than the melting point of the film.

5. The method of claim 4 where the dwell time of the film on the tempering roll is at least about 0.05 second.

6. The method of claim 5 wherein the temperature of the film drops less than 40° C. as it is being set on the tempering roll.

7. The method of claim 6 wherein the film is cooled on the cooling roll to a temperature below about 70° C.

8. The method of claim 7 wherein the film is a polyolefin.

9. The method of claim 8 wherein the film is polyethylene, polypropylene, or a copolymer of ethylene or propylene with another ethylenically unsaturated monomer wherein the ethylene or propylene content is at least fifty mole percent.

10. The method of claim 1 wherein the temperature of the film drops from 0° to 40° C. as it is being set on the tempering roll.

* * * * *